United States Patent

Itonaga et al.

[11] Patent Number: 5,911,295
[45] Date of Patent: Jun. 15, 1999

[54] RETURN SPRING FOR CLUTCH

[75] Inventors: Kazuhiro Itonaga; Jun Tokumasu, both of Hamamatsu; Kenjiro Kawanabe, Higashiharutika-Ina; Yutaka Nishida, Komagane; Ichiro Sasuga, Yamato, all of Japan

[73] Assignees: F.C.C. Ltd., Shizuoka-Pref; NHK Spring Co., Ltd., Yokohama, both of Japan

[21] Appl. No.: 08/942,185

[22] Filed: Oct. 1, 1997

[51] Int. Cl.$^6$ .............................. F16D 25/06; F16F 1/06
[52] U.S. Cl. ................... 192/70.28; 192/85 AA; 267/179
[58] Field of Search ................. 192/70.28, 85 AA; 92/130 R; 267/166, 174, 179

[56] References Cited

U.S. PATENT DOCUMENTS 5,464,198 11/1995 Yanko et al. ................... 267/179 X
5,558,195 9/1996 Bucciero ........................... 192/85 AA

FOREIGN PATENT DOCUMENTS 1-26914   8/1989  Japan .
3-234919  10/1991 Japan ..................................... 192/85
6-10226   3/1994  Japan .

*Primary Examiner*—Richard M. Lorence
*Attorney, Agent, or Firm*—Frishauf, Holtz, Goodman, Langer & Chick

[57] ABSTRACT

A compression coil spring is used as a return spring which is stored in the housing of a clutch to urge the clutch piston in its returning direction. The effective number of turns of the compression coil spring is two or less, and the number of turns at an end-turn portion thereof is more than 0.45 and not more than 0.7. The compression coil spring is used in the compressed state throughout the operating stroke of the clutch piston. The number of turns at the end-turn portion is desirably within the range of 0.5 to 0.65, more desirably within the range of 0.55 to 0.62.

3 Claims, 4 Drawing Sheets

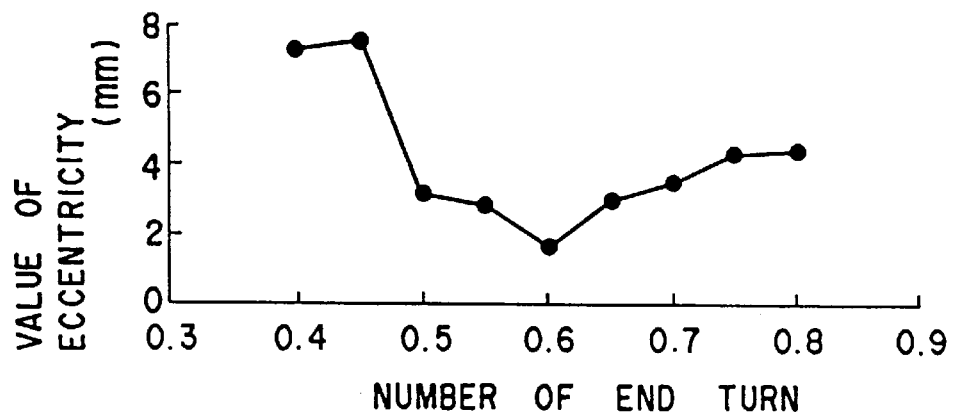
F I G. 6
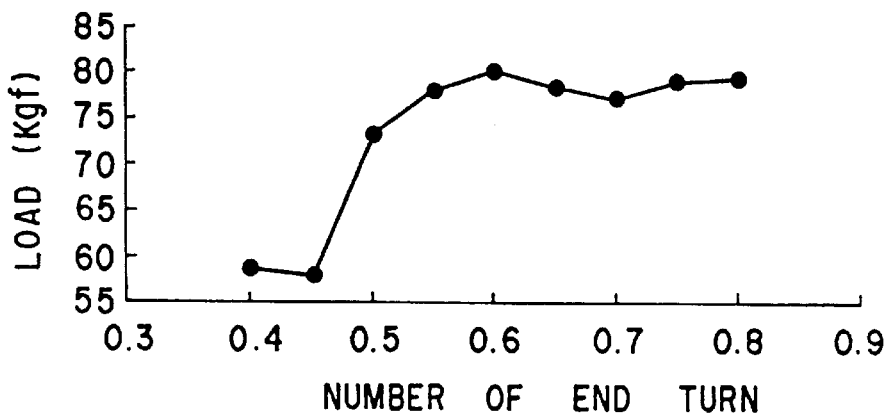
F I G. 7
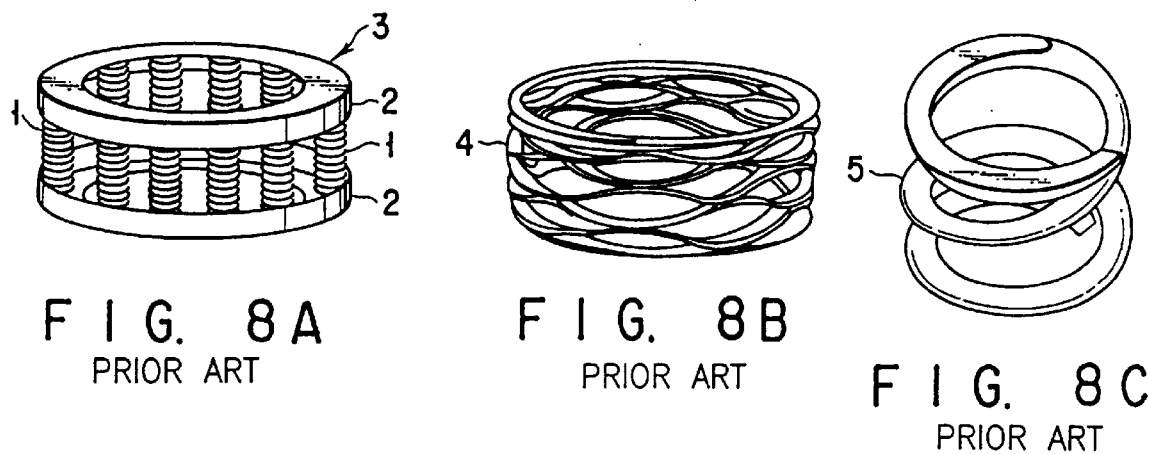
F I G. 8A
PRIOR ART
F I G. 8B
PRIOR ART
F I G. 8C
PRIOR ART

RETURN SPRING FOR CLUTCH

BACKGROUND OF THE INVENTION

The present invention relates to a return spring which is employed, for example, in the multiple disc clutch of an automobile's automatic power transmission.

A multiple disc clutch employed in an automatic power transmission or the like comprises a housing, a clutch piston, a number of input friction discs, and a number of output friction discs. Inside the housing, the input friction discs and the output friction discs are alternately arranged in such a manner that they can come into contact with each other and be separated from each other. When the clutch piston is hydraulically driven, the input friction discs and the output friction discs engage with each other, with the result that the clutch is let in (clutch meet). The clutch device incorporates a return mechanism. When the hydraulic pressure exerted on the clutch piston becomes lower than the predetermined value, the return spring of the return mechanism moves the piston back to the original position. When the piston returns to the original position, the input friction discs and the output friction discs are disengaged from each other, with the result that the clutch is released.

A variety of return springs, which are to be incorporated in multiple disc clutches, are designed in accordance with the types of automobiles. The retainer assembly 3 shown in FIG. 8A is a return spring of one type. In the retainer assembly 3, a plurality of coil springs 1 are arranged in the circumferential direction of retainers 2. An example of such a retainer assembly is disclosed in Jpn. UM Application KOKOKU Publication No. 1-26914. The spiral wave spring 4 shown in FIG. 8B is also known as being usable as a return spring. The spiral wave spring 4 is made of a flat spring material, and this material is worked in such a manner as to form a wave pattern. An example of such a spring wave spring is disclosed in Jpn. UM Application KOKOKU Publication No. 6-10226. The compression coil spring 5 shown in FIG. 8C is still another example of a return spring.

In these types of return springs, the distribution of load must be as uniform as possible at the contact portion between the bearing surface of a spring and the end face of a clutch piston. In a clutch piston used in this manner, the dimension in the axial direction is much smaller than the piston diameter. This being so, the distribution of load must be as uniform as possible in the bearing surface of the return mechanism. If the distribution of load is not uniform, it is likely that the clutch piston will tilt with reference to its corresponding structural member (i.e., the inner face of the cylinder). If the clutch piston tilts, the following problems (a) to (d) may occurs (a) The piston comes into tight engagement with its corresponding structural member and does not move.

(b) The piston does not smoothly move, resulting in the generation of noise (so-called squeaking noise).

(c) A force is applied concentratedly to the sliding contact portion between the piston and the corresponding structural member, resulting in non-uniform abrasion.

(d) Since the piston tilts even when the residual pressure is low, it may not completely return to the original position, resulting in the occurrence of a clutch drag.

Of the three types of return springs mentioned above (namely, the retainer assembly 3, spiral wave spring 4, single compression coil spring 5 shown in FIGS. 8A, 8B and 8C), the compression coil spring 5 is advantageous in that it can be incorporated in a clutch at low cost since it is simpler in structure than the others and can be manufactured and assembled at low cost. However, the spring storage space inside the clutch is very narrow. In particular, the spring storage space is very restricted in dimension in the axial direction of the compression coil spring. Although the compression coil spring has to be made of a wire whose diameter is large enough to satisfy the required spring constant, such a coil spring cannot be stored inside the clutch unless the number of effective turns is small In fact, a compression coil spring whose effective turns are two or more cannot be used as a spring coil incorporated in a clutch It should be noted that a compression coil spring with a small number of effective turns has problems in that the eccentricity (eccentric distance) between the center of the coil spring and the center of load is long and the distribution of load in the bearing surface is therefore likely to be non-uniform. In the case of a conventional compression coil spring having an open-ended end turns its end-turn portion is normally designed to have 0.7 turns or more, so as to ensure a stable seated condition when no load is applied (i.e., when the compression coil spring has a free length) However, if the effective turns are two or less and the end-turn portion has 0.7 turns or more, the eccentricity between the center of the coil spring and the center of load is inevitably long, and the use of such a compression coil spring gives rise to the problems (a) to (d) mentioned above. It is therefore not undesirable to use such a coil spring as a return spring to be incorporated in a clutch.

BRIEF SUMMARY OF THE INVENTION

Accordingly, an object of the present invention is to provide a compression coil spring which can be satisfactorily used as the return spring of a clutch, has two or less effective turns, enables the eccentricity between the center of the coil spring and the center of load to be as short as possible, and is free of the problem that the clutch piston tilts.

To achieve this object, the present invention provides a return spring for use in a clutch, which is stored in the housing of the clutch to urge a clutch piston in its returning direction, the return spring being a compression coil spring which is stored inside the housing, with initial deflection provided (i.e., in the compressed state), and has an end-turn portion at each end, the compressing coil spring having not more than two effective turns, and the end-turn portion having turns which are more than 0.45 and not more than 0.7.

A compression coil spring having the above structure enables the eccentricity between the center of the coil spring and the center of load to be as short as possible and provides a uniform distribution of load. In general, a compression coil spring having 0.7 turns or less at the end-turn portion may not be satisfactorily seated when it is in the free-load state. However, a compression coil spring designed as a return spring incorporated in a clutch is stored in the housing in the initially compressed state (i.e., it is compressed at all times inside the housing), and is used with a comparatively short piston stroke. In addition, the compression coil spring is made of a wire having a comparatively large diameter. Hence, the compression coil spring does not tilt even though it has 0.7 turns or less at the end-turn portion.

As can be seen from this, the present invention is advantageous in the following points:

(1) The piston is prevented from coming into tight engagement with its corresponding structural member.

(2) When the piston is operated, it does not generate noise, such as squeaking noise.

(3) A force is not concentratedly applied to the sliding contact portion between the piston and the corresponding structural member, and local abrasion is suppressed thereby.

(4) Since the clutch operates with high responsiveness even to a low residual force (hydraulic force), a so-called clutch drag can be prevented.

(5) Since the single coil spring is made of a wire with a simple cross sectional shape and can be used without being combined with another member, it is very simple in structure in comparison with a conventional retainer assembly or a conventional spiral wave spring. Since it can be easily assembled with reference to a clutch, a clutch incorporating the subject return spring can be realized at low cost.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 6 is a graph showing the relationship between the eccentricity and the number of end turns of a compression coil spring;

FIG. 7 is a graph showing the relationship between the load and the number of end turns of the compression coil spring; and FIGS. 8A, 8B and 8C are perspective views showing examples of conventional springs constituting return mechanisms.

DETAILED DESCRIPTION OF THE INVENTION

An embodiment of the present invention will now be described.

Figure 3:
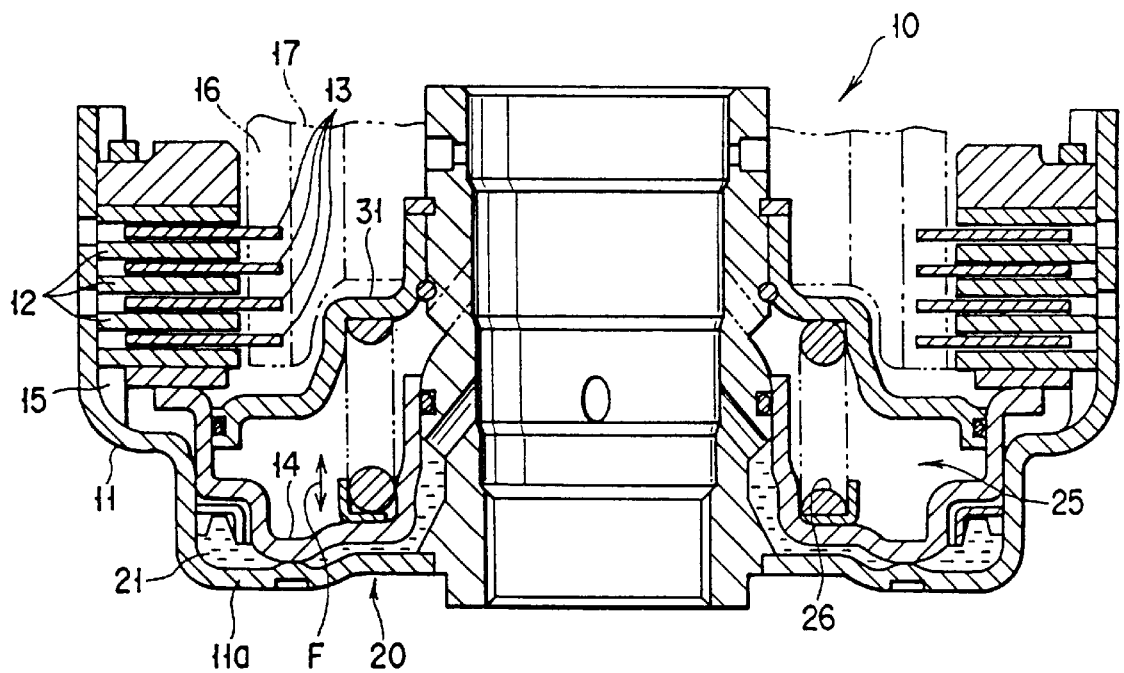
FIG. 3 is a sectional view of a clutch device incorporating the coil spring depicted in FIG. 1.

FIG. 3 shows multiple disc clutch 10 for use in an automatic power transmission. Referring to FIG. 3, the multiple disc clutch 10 comprises a plurality of friction discs 12 and 13 alternately arranged inside a housing 11, and a clutch piston 14 that pushes the friction discs. The clutch piston 14 is stored in the cylinder section 11a of a housing 11, and is movable in the axial direction of the housing 11 (i.e., the direction F indicated by the arrow in FIG. 3).

The friction discs 12 and 13 are also movable in the axial direction of the housing 11. The friction discs 12 and 13 engage or meet with each other when they are pressed by the clutch piston 14. Friction discs 12 are rotatable together with the housing 11 by means of a spline 15; likewise, friction discs 13 are rotatable together with a rotational shaft 17 by means of another spline 16.

The clutch piston 14 is driven by the hydraulic mechanism 20 of the clutch 10. The hydraulic mechanism 20 has a hydraulic pressure chamber 21 defined between the cylinder section 11a and the piston 14. When a hydraulic fluid of predetermined pressure is supplied to the hydraulic pressure chamber 21 from a hydraulic pressure source (not shown), the piston 14 is driven in the direction permitting the friction discs 12 and 13 to come into contact with each other, thus producing the state of clutch meet.

The clutch 10 is provided with a return mechanism 25 for returning the piston 14 when the pressure in the hydraulic pressure chamber 21 becomes lower than a predetermined value. The return mechanism 25 includes a compression coil spring 26 that serves as a return spring. When the hydraulic pressure in the hydraulic pressure chamber 21 is lower than the predetermined value, the piston 14 is returned by the elastic resilience of the compression coil spring 26, thereby disengaging the friction discs 12 and 13 from each other. Accordingly, the clutch is released.

Figure 1:
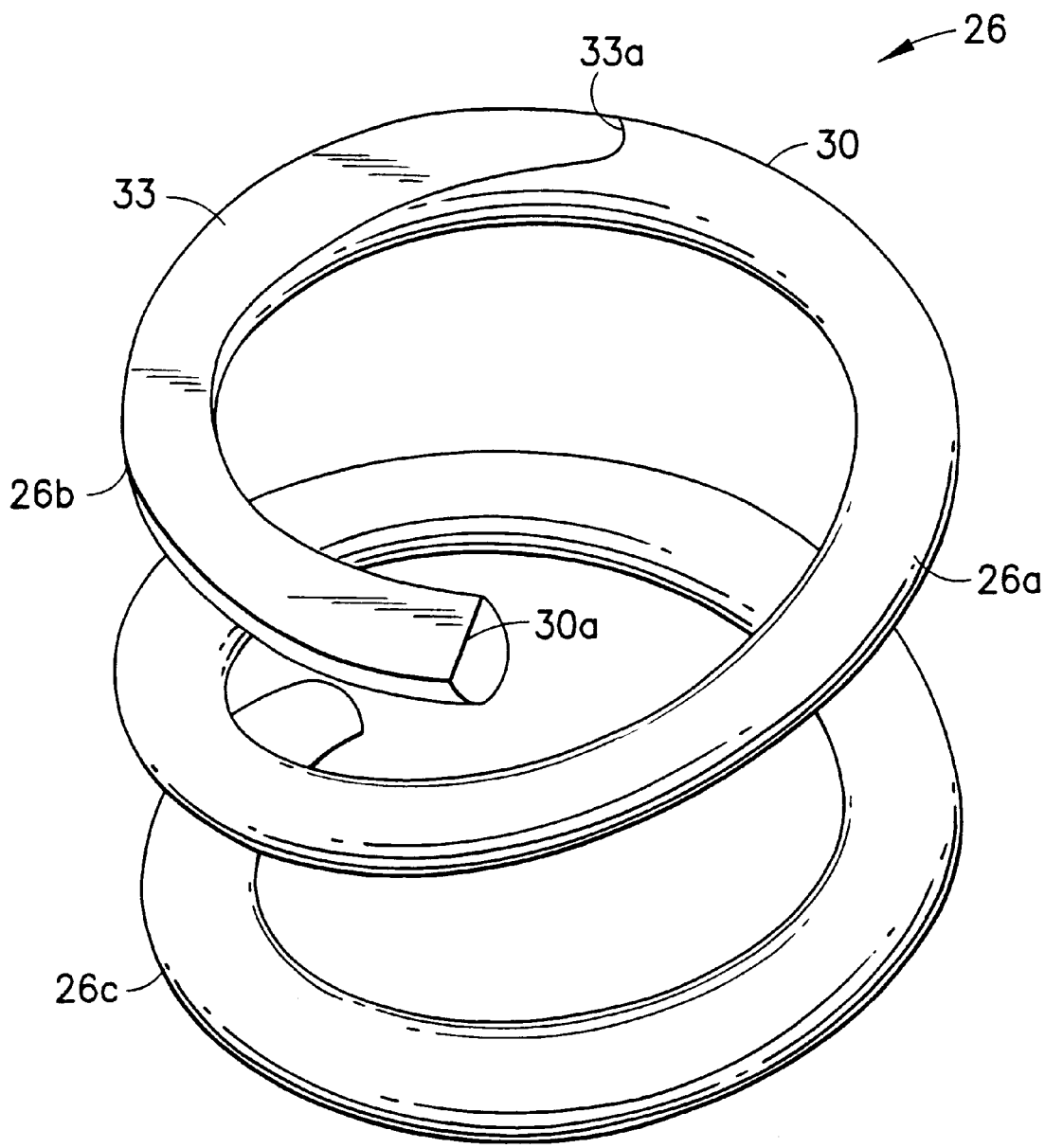
FIG. 1 is a perspective view showing a compression coil spring according to one embodiment of the present invention.
Figure 2:
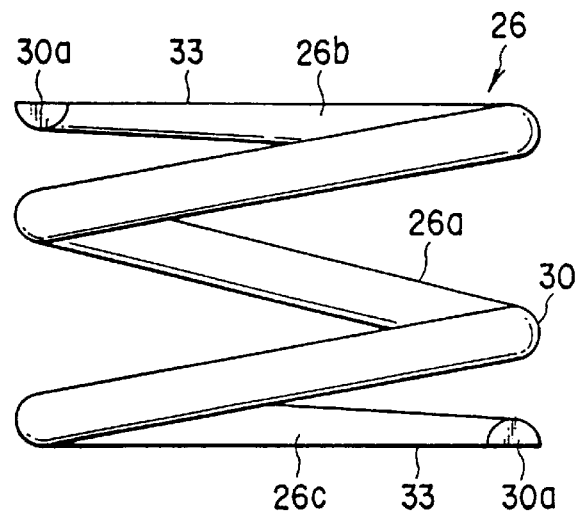
FIG. 2 is a side view of the coil spring depicted in FIG. 1.

As shown in FIGS. 1 and 2, the compression coil spring 26 is formed by winding a wire 30 made of a spring steel in such a manner as to form a spiral shape. Inside the housing 11, the spring 26 is arranged between a spring receiving member 31 and the piston 14, with initial compression provided (i.e., in the compressed state). The spring 26 is used in the compressed state throughout the operating stroke of the piston 14 (the piston stroke in the direction F indicated by arrow F).

The compression coil spring 26 is made up of an effective-turn portion 26a with two turns or less and end-turn portions 26b and 26c located at the respective ends of the effective-turn portion 26a. The end-turn portions 26b and 26c are kept in contact with their corresponding structural members (spring receiving surfaces) even when no load is applied to the compression coil spring 26. In the bearing surface of each of the end-turn portions 26b and 26c, a tapered face 33 is formed. This face 33 is tapered toward the end 30a of the wire 30, i.e., it gradually thins toward the end 30a by grinding and polishing. The end-turn portion 26b, 26c can be defined as a portion located between the end 30a of the wire 30 and the position 33a from which face 33 is substantially tapered toward that end. The effective-turn portion 26a can be defined as a portion which is movable away from the corresponding structural members (i.e., spring receiving members). In other words, the effective-turn portion 26a is a portion which is compressed in accordance with the load applied to the spring.

In the compression coil spring 26 mentioned above, the number of turns is determined to be 2 or less at the effective-turn portion 26a, and the number n of turns is determined to be more than 0.45 and not more than 0.7 (0.45≦n≦0.7) at the end-turn portions 26b and 26c. In the conventional compression coil spring, the number of turns at each end-turn portion is between 0.75 and 1.0. The compression coil spring 26 of the present invention can be regarded as being a coil spring obtained by cutting off the wire ends of the tapered end-turn portions, in such a manner that the number of turns at each end-turn portion can be larger than 0.45 but does not exceed 0.7. In the conventional art, the wire end portions of a coil are not cut off in this manner. The reason for determining the number of turns at the effective-turn portion 26a to be 2 or less is that this number of turns enables the entire compression coil spring to be stored in the narrow restricted space inside the clutch, even in the case where the compression coil spring 26 is made of a wire 26 thick enough to satisfy the required load (e.g., 100 kgf).

Figure 4:
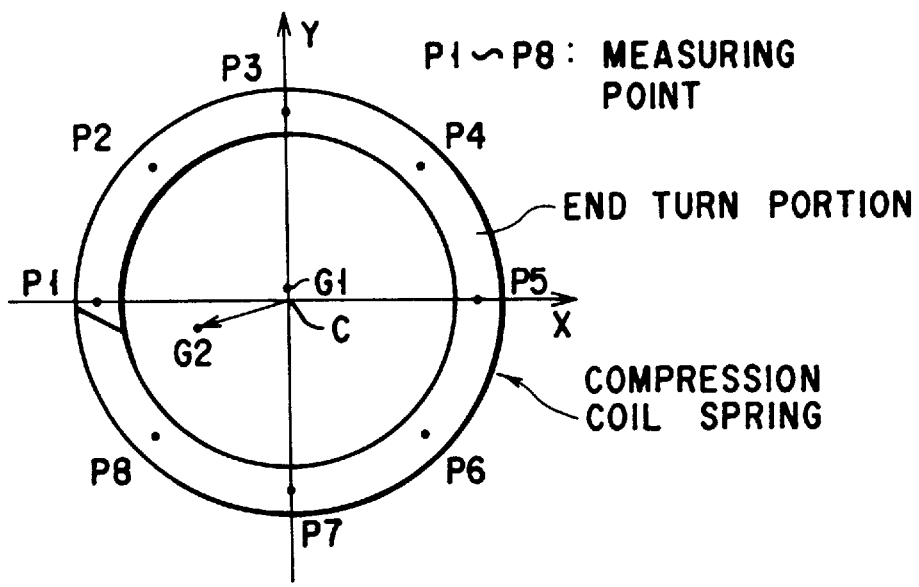
FIG. 4 is a plan view showing the points of measurement at which the load exerted on the end-turn portion of the coil spring is measured.

With respect to a conventional coil spring and a coil spring embodying the present invention, the eccentricity between the center C of the springs and the center G1, G2 of load was examined. To be more specific, the coil springs were compressed, and the loads applied to the eight points P1 to P8 shown in FIG. 4 were measured. (Points P1 to P8 are on a concentric circle and arranged at regular intervals.) The results of measurement are shown in Table 1 set forth below. In the case of the conventional compression coil spring shown in Table 1, the effective number of turns is 1.5, and the number of end turns is 0.75. In the case of the compression coil spring according to the present invention, the effective number of turns is 1.5, and the number of end turns is 0.6. In the column of "Presettings of Spring", symbol H denotes the height (mm) which the spring has when compressed, and symbol P denotes a load (kgf). The average coil diameter $\phi$ the wire diameter $\phi$ and the free length of each coil spring are 55.75 mm, 6.0 mm and 40.9 mm, respectively.

Figure 5:
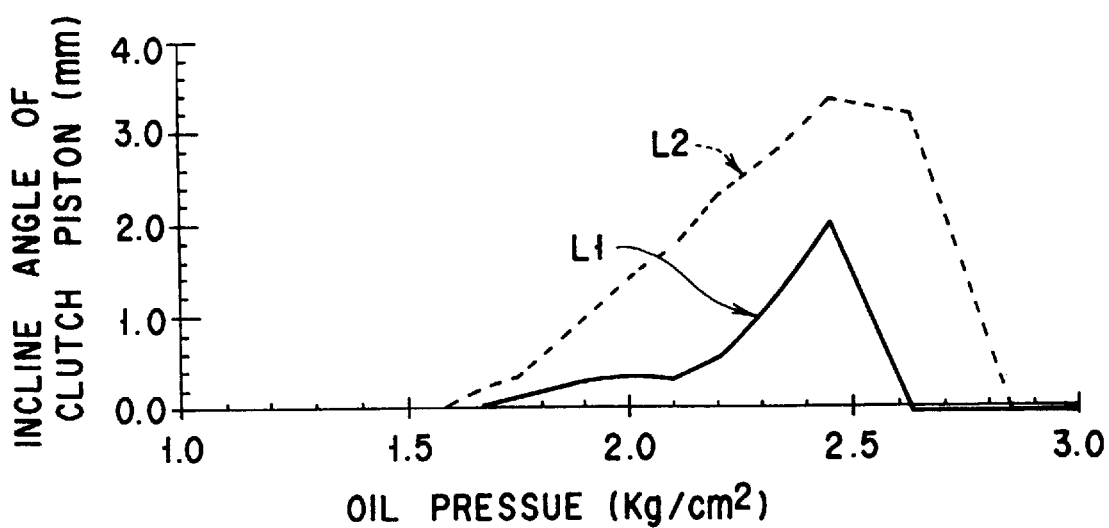
FIG. 5 is a graph showing the tilt difference between the coil spring of the embodiment and the coil spring of the prior art.

How the pistons tilt at the time was detected by measuring the height difference between the opposing side portions of the piston. The results of the measurement are shown in FIG. 5. In FIG. 5, line segments L1 represent measurements pertaining to the coil spring according to one embodiment of the present invention, while line segments L2 represent measurements pertaining to the conventional coil spring. When the hydraulic pressure was 3.0 kgf/cm$^2$ or lower, the maximal tilt of the piston of the conventional coil spring was 3.4 mm or so, while the maximal tilt of the piston of the coil spring according to the embodiment was as short as 2.0 mm.

FIG. 6 shows how the eccentricity and the number of end turns of a compression coil spring are related to each other when the load is 100 kgf. As can be seen from FIG. 6, the eccentricity is a small value when the number n of end turns satisfies $0.45 \leq n \leq 0.7$. The eccentricity is as small as 3 mm or so when the number n of end turns is in the range of $0.5 \leq n \leq 0.65$, so that this range is more desirable to the value of n. In order to provide a coil spring which is light in weight, the number of end turns should be as small as possible. In practice, however, the eccentricity becomes smallest when the number of turns is 0.6 or so. In addition, the number of end turns may not be exactly the same at all times; it may deviate from the intended value by 3% or so during the manufacturing process of coil springs. In view of these, the upper limit of the number n of end turns should preferably be 0.62 or so ($n \leq 0.62$).

FIG. 7 shows the relationship between the load and the number of end turns when a compression coil spring whose

TABLE 1

| | presettings of spring | average coil diameter | P1 | P2 | P3 | P4 | P5 | P6 | P7 |
|---|---|---|---|---|---|---|---|---|---|
| prior art | H = 23.3 | 55.75 | 11.06 | 23.23 | 0.00 | 8.79 | 8.24 | 0.00 | 28.18 |
| | P = 100 | 55.75 | 4.16 | 37.54 | 0.00 | 10.97 | 7.63 | 0.00 | 40.20 |
| | (H = 20.5) | | | | | | | | |
| | H = 19.3 | 55.75 | 2.03 | 41.75 | 0.10 | 12.98 | 6.95 | 0.10 | 44.81 |
| present invention | H = 23.3 | 55.75 | 22.14 | 14.40 | 0.00 | 0.00 | 21.16 | 17.29 | 0.00 |
| | P = 100 | 55.75 | 33.13 | 13.52 | 0.00 | 0.00 | 31.16 | 17.82 | 0.00 |
| | (H = 20.3) | | | | | | | | |
| | H = 19.3 | 55.75 | 36.53 | 13.41 | 0.00 | 0.00 | 34.45 | 18.03 | 0.00 |

| | P8 | total load | X | Y | eccentricity |
|---|---|---|---|---|---|
| prior art | 0.00 | 79.50 | −4.569 | −1.942 | 4.964 |
| | 0.00 | 100.00 | −4.249 | −1.636 | 4.553 |
| | 0.00 | 108.72 | −3.936 | −1.559 | 4.234 |
| present invention | 0.00 | 79.00 | 0.395 | −0.760 | 0.856 |
| | 0.00 | 100.00 | 0.312 | −0.886 | 0.940 |
| | 0.00 | 106.90 | 0.323 | −0.889 | 0.946 |

As can be seen from Table 1, the total load exerted on the conventional compression coil spring and that exerted on the subject compression coil spring are substantially equal. With respect to the eccentricity of the center of load, however, the compression coil spring of the present invention exhibited an improved value of about 0.9 mm, as against about 4.9 mm of the conventional compression coil spring. In the compression coil springs shown in Table 1, the number of effective turns of each spring was 1.5. Results similar to those shown in Table 1 were confirmed, provided the number of effective turns was not greater than 2.0.

A conventional compression coil spring (the effective number of turns of which was 2 or less) and the subject compression coil spring were assembled in clutches having the same structure (see FIG. 3), and a hydraulic fluid was supplied to the hydraulic pressure chamber of each clutch.

effective number of turns is 1.5 is compressed to have a predetermined height. As can be seen from the FIGURE, the load is greatly decreased where the number of end turns is 0.45 or so, and the specifications required of the compression coil spring cannot be met. Where the number of end turns is greater than 0.55 ($0.55 \leq n$), the load is substantially constant. It is therefore desirable that the number of end turns be greater than 0.55. As far as the data in FIG. 7 is concerned, the predetermined load can be dealt with in the case where the number of turns is 0.5 or more. Needless to say, however, it is possible to use a compression coil spring whose number of end turns is 0.5 or less, depending upon the specifications required.

A compression coil spring of the present invention has a small number of end turns in comparison with a compression coil of the prior art. In general, such a compression coil spring has problems in that it is not necessarily in the stable seated state when it is not applied with any load and therefore has a free length. However, since the compression coil spring of the present invention is employed as the return spring of a clutch, it is stored inside a housing, with initial compression provided, and is used in the compressed state throughout the operating stroke of the clutch piston. As long as a compression coil spring is used in this manner, it is in the stable seated condition at all times within the range of the number of end turns determined in the present invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

We claim:

1. A return spring for use in a clutch, which is adapted to be stored in a housing of the clutch to urge a clutch piston in a returning direction, said return spring being a compression coil spring which is adapted to be stored inside the housing, with initial compression provided, and said compression coil spring comprising an end-turn portion having a ground and polished tapered face at an end thereof, and said compressing coil spring having not more than two effective turns, and wherein said ground and polished tapered face of said end-turn portion extends circumferentially of the compression coil spring in the range of more than 0.45 of 360° and not more than 0.7 of 360°.

2. A return spring for use in a clutch, according to claim 1, wherein said end-turn portion of said compression coil spring has turns which are in a range of 0.5 of 360° to 0.65 of 360°.

3. A return spring for use in a clutch, according to claim 1, wherein said end-turn portion of said compression coil spring has turns which are in a range of 0.55 of 360° to 0.62 of 360°.

* * * * *